United States Patent
Hsueh

(10) Patent No.: US 9,275,216 B2
(45) Date of Patent: Mar. 1, 2016

(54) ELECTRONIC DEVICE AND METHOD FOR UNLOCKING ELECTRONIC DEVICE

(71) Applicant: Chiun Mai Communication Systems, Inc., New Taipei (TW)

(72) Inventor: Ching-Wen Hsueh, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 14/132,803

(22) Filed: Dec. 18, 2013

(65) Prior Publication Data

US 2014/0181961 A1    Jun. 26, 2014

(30) Foreign Application Priority Data

Dec. 24, 2012   (TW) .............................. 101149454 A

(51) Int. Cl.
G06F 21/00   (2013.01)
*G06F 21/36*   (2013.01)
*H04W 12/06*   (2009.01)
*H04W 88/02*   (2009.01)

(52) U.S. Cl.
CPC ............... *G06F 21/36* (2013.01); *H04W 12/06* (2013.01); *H04W 88/02* (2013.01)

(58) Field of Classification Search
USPC ........................................................ 726/16–20
See application file for complete search history.

(56) References Cited

U.S. PATENT DOCUMENTS

| | | | |
|---|---|---|---|
| 8,850,560 B2 * | 9/2014 | Kim et al. ........................ | 726/19 |
| 2013/0055169 A1 * | 2/2013 | Wright et al. .................. | 715/863 |
| 2013/0113723 A1 * | 5/2013 | Chen et al. ..................... | 345/173 |

* cited by examiner

*Primary Examiner* — Ghazal Shehni
(74) *Attorney, Agent, or Firm* — Novak Druce Connolly Bove + Quigg LLP

(57) ABSTRACT

In a method for unlocking an electronic device, a plurality of icons are preset and an icon is designated to be an unlocking icon for unlocking the electronic device. When the electronic device is locked, the icons are moving on the display device, and the moving icons is highlighted one by one according to a moving direction and a time interval. When a highlighted icon is touched and the highlighted icon is the unlocking icon, the electronic device is unlocked.

13 Claims, 5 Drawing Sheets

ELECTRONIC DEVICE AND METHOD FOR UNLOCKING ELECTRONIC DEVICE

BACKGROUND

1. Technical Field

Embodiments of the present disclosure relate to locking and unlocking technology, and particularly to an electronic device and method for unlocking the electronic device.

2. Description of Related Art

Some electronic devices may be locked or unlocked using the display (e.g., touch panels) of the electronic devices. When people do not need to operate the electronic devices, the electronic device may be locked to reduce power consumption. Then the electronic devices may be unlocked according to user requirements. However, most unlocking methods are implemented by touching or dragging an icon displayed at a predetermined position of the display devices. This is tedious. Therefore, an improved method for unlocking the electronic device is desired.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean "at least one."

All of the processes described below may be embodied in, and fully automated via, functional code modules executed by one or more general purpose electronic devices or processors. The code modules may be stored in any type of non-transitory computer-readable medium or other storage device. Some or all of the methods may alternatively be embodied in specialized hardware. Depending on the embodiment, the non-transitory computer-readable medium may be a hard disk drive, a compact disc, a digital video disc, a tape drive or other suitable storage medium.

Figure 1:
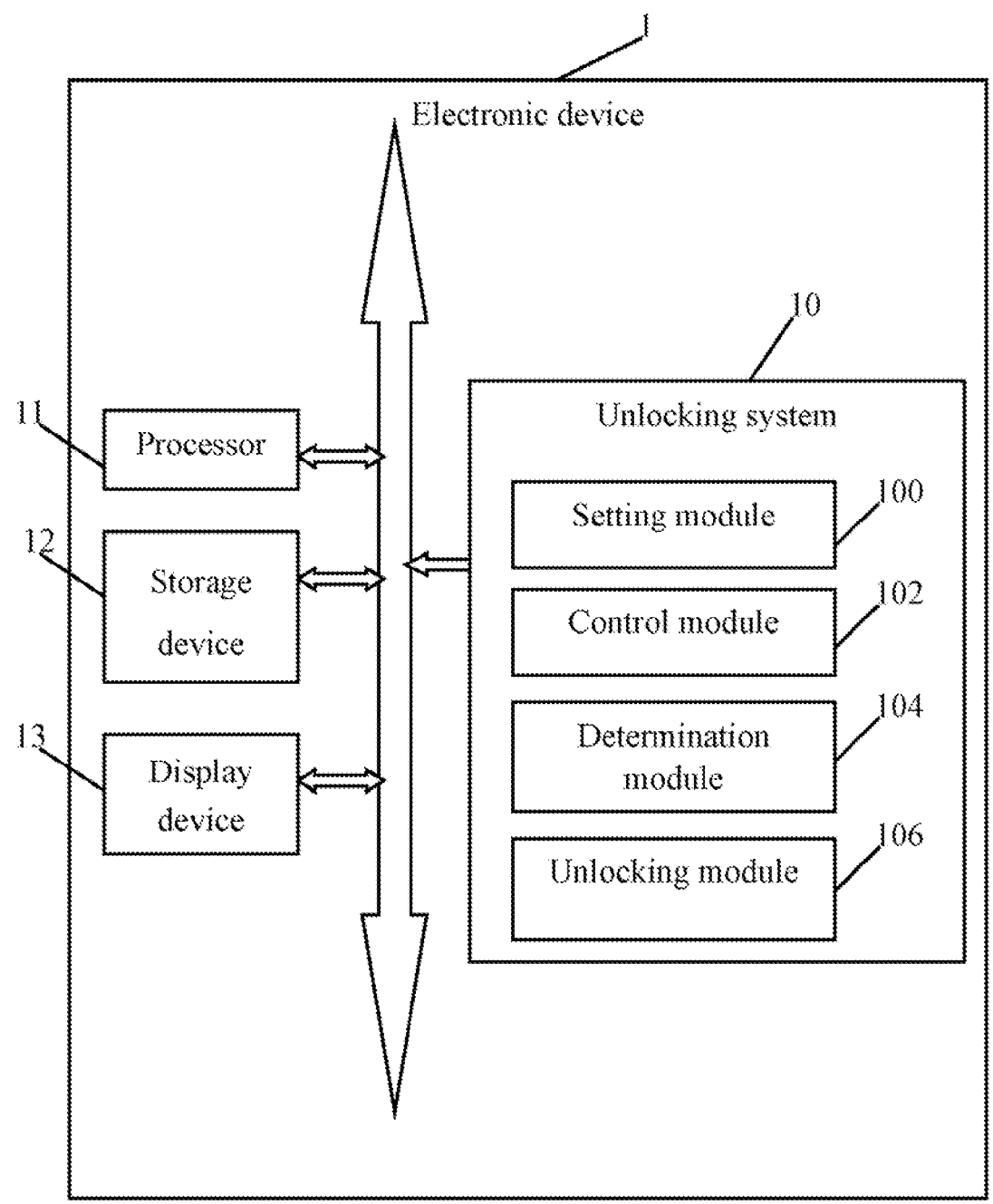
FIG. 1 is a block diagram of one embodiment of an electronic device including an unlocking system.

FIG. 1 is a block diagram of one embodiment of an electronic device 1 including an unlocking system 10. The electronic device 1 may be a mobile phone, a tablet computer, a personal digital assistant, a notebook computer, or other computing device. The electronic device 1 further includes at least one processor 11, a storage device 12, and a display device 13. FIG. 1 illustrates only one example of the electronic device 1 that may include more or fewer components than illustrated, or have a different configuration of the various components.

The at least one processor 11 is used to execute the unlocking system 10 and other applications, such as an operating system, installed in the electronic device 1. The storage devices 12 store one or more programs, such as the operating system and applications of the electronic device 1. The storage device 12 can be a storage card, such as a memory stick, a smart media card, a compact flash card, a secure digital card, or any other type of memory storage device.

The display device 13 displays visible data, such as videos, or images, for example. In some embodiments, the display device 13 may be a touch panel, such as a capacitive touch panel.

In some embodiments, the electronic device 1 may be unlocked when the electronic device 1 does not need to be operated, to avoid mistouch on the display device 13. The unlocking system 10 presets a plurality of icons which are moving on the display device 13 when the electronic device 1 is unlocked, designates an unlocking icon among the icons, highlights the icons one by one according to preset parameters, determines a touched icon when a highlighted icon is pressed, and unlocks the electronic device 1 when the touched icon is the unlocking icon.

In one embodiment, the unlocking system 10 may include one or more modules, for example, a setting module 100, a control module 102, a determination module 104, and an unlocking module 106. In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable medium include CDs, DVDs, BLU-RAY, flash memory, and hard disk drives.

Figure 5:
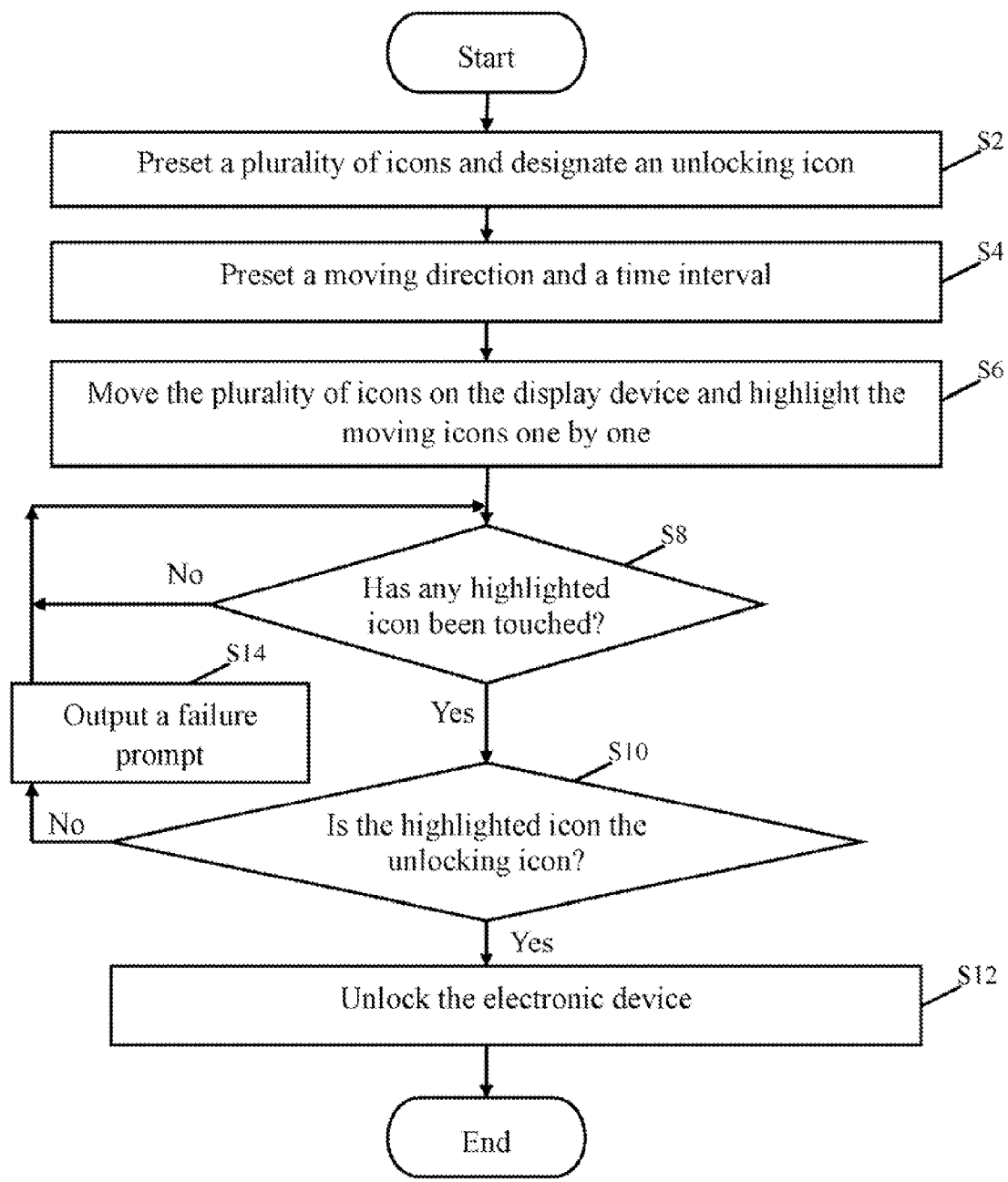
FIG. 5 is a flowchart of one embodiment of a method for unlocking the electronic device using the unlocking system.

FIG. 5 is a flowchart of one embodiment of a method for unlocking the electronic device 1 using the unlocking system 10. Depending on the embodiment, additional steps may be added, others removed, and the ordering of the steps may be changed.

Figure 2:
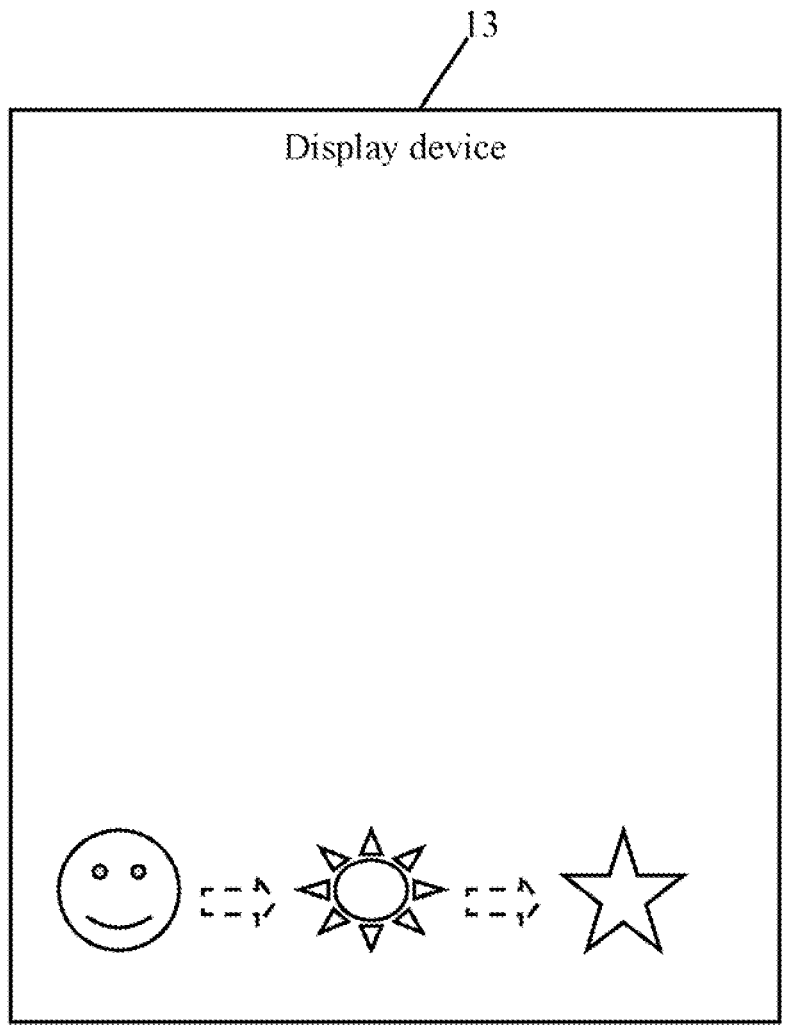
FIG. 2 is a first schematic diagram of an unlocking interface provided by the unlocking system.
Figure 3:
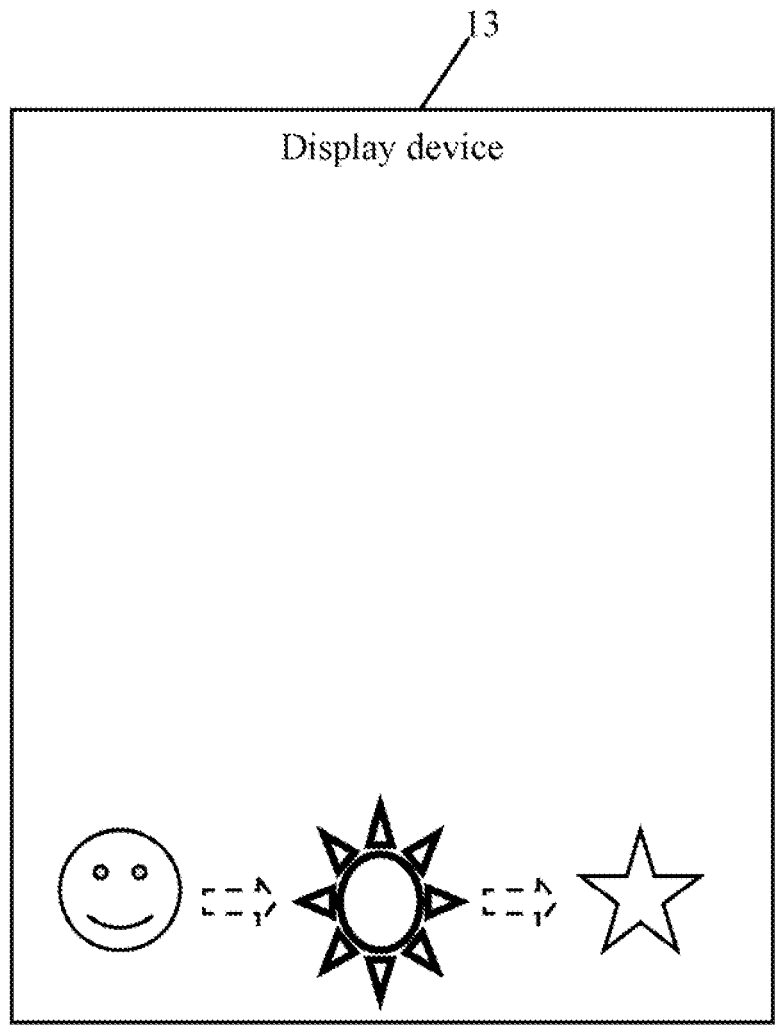
FIG. 3 is a second schematic diagram of the unlocking interface.

In step S2, the setting module 100 presets a plurality of icons, and designates an icon among the icons to be an unlocking icon for unlocking the electronic device 1. The icons may be any kind of images. For example, FIG. 2 and FIG. 3 show an unlocking interface provided by the unlocking system 10 on the display device 13. In the unlocking interface as shown in FIG. 2 and FIG. 3, the setting module 100 presets three icons, a user of the electronic device 1 may select one icon to be the unlocking icon, such as the middle icon (an image of the sun) is selected to be the unlocking icon.

Figure 4:
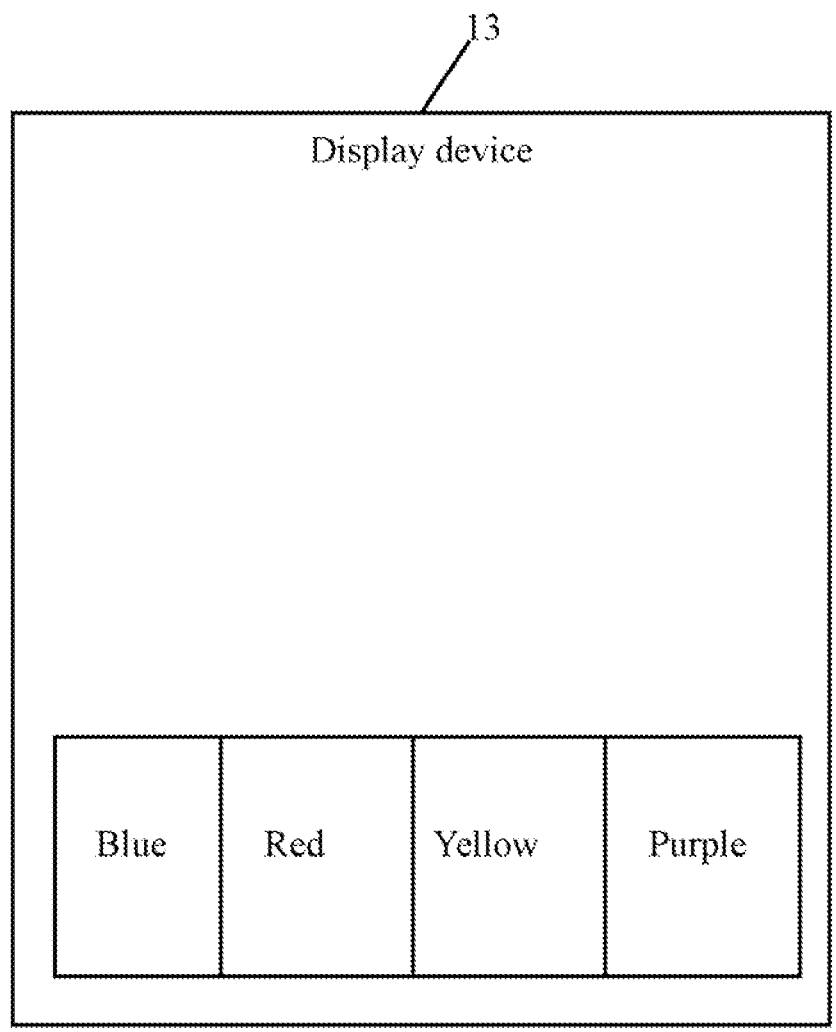
FIG. 4 is a third schematic diagram of the unlocking interface.

For another example, FIG. 4 shows that four color blocks are preset and formed a color ribbon. In the color ribbon, multiple colors can be predetermined according to user requirements, such as blue, red, yellow, and purple. The red color block is designated to be the unlocking icon.

In step S4, the setting module 100 presets a moving direction (e.g., upward, downward, leftward, rightward) and a time interval (e.g., 1 second) for moving the icons on the display device 13. In addition, the setting module 100 may further preset a moving sequence of the icons, and preset a display region on the display device 13 to include the icons. A position of the display region can be predetermined by the setting module 100, and also can be a random position on the display device 13 each time the electronic device 1 is locked. Furthermore, the position of the display region can be changed according to a dragging operation of the user.

In step S6, the control module 102 moves the icons on the display device 13 when the electronic device 1 is locked, and highlights the moving icons one by one according to the moving direction and the time interval. For example, when the icons are moving on the display device 13, one icon is highlighted at a time interval, and then a next icon is highlighted after the time interval. As shown in FIG. 3, the image of the sun is the highlighted icon.

As another example, when the icons are the color blocks, the control module 102 highlights one color block at each time interval.

In step S8, the determination module 104 determines whether any highlighted icon has been touched. In some embodiments, when an un-highlighted icon has been touched, the determination module 104 does not process any corresponding touch signal. When the highlighted icon has been touched, step S10 is implemented. When no highlighted icon has been touched, the procedure returns to step S8.

In step S10, the determination module 104 determines whether the highlighted icon is the unlocking icon. When the highlighted icon is the unlocking icon, step S12 is implemented. When the highlighted icon is not the unlocking icon, step S14 is implemented.

In step S12, the unlocking module 106 unlocks the electronic device 1, and then the procedure ends.

In step S14, the unlocking module 106 outputs a failure prompt to indicate the user that an unlocking operation is failed when the highlighted icon is not the unlocking icon, and then the procedure returns to step S8. In other embodiments, when a touch icon is not the highlighted icon, the unlocking module 106 also outputs the failure prompt.

In other embodiments, the setting module 100 may designate a group of icons to be the unlocking icons, and preset an unlocking sequence of the unlocking icons. The unlocking module 106 unlocks the electronic device 1 under the condition that the unlocking icons have been touched one by one according to the unlocking sequence when the unlocking icons are highlighted.

In other embodiments, when the user fails to unlock the electronic device 1 for a predetermine number of times, such as 3 times, the unlocking module 106 may shut down the electronic device 1 to avoid information leakage.

It should be emphasized that the above-described embodiments of the present disclosure, particularly, any embodiments, are merely possible examples of implementations, set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure is protected by the following claims.

What is claimed is:

1. A computer-implemented method for unlocking an electronic device, the electronic device comprising a display device, the method comprising:
   presetting a plurality of icons, and designating an unlocking icon in the plurality of icons, wherein the unlocking icon comprises a group of icons in the plurality of icons and the group of icons have an unlocking sequence;
   displaying and moving the plurality of icons on the display device when the electronic device is locked and activated, and highlighting the plurality of icons one by one according to a moving direction and a time interval;
   in response to detecting a touch signal on a highlighted icon, determining whether the highlighted icon is the unlocking icon; and
   unlocking the electronic device when the highlighted icon is the unlocking icon and the group of icons of the unlocking icon have been touched one by one according to the unlocking sequence.

2. The method according to claim 1, further comprising:
   outputting a failure prompt when a touch icon is not the highlighted icon or when the highlighted icon is not the unlocking icon.

3. The method according to claim 1, wherein the plurality of icons are a plurality of color blocks having different colors, and the plurality of color blocks are arranged to be a color ribbon.

4. The method according to claim 1, further comprising:
   presetting a display region on the display device to comprise the plurality of icons; and
   predetermining a position of the display region on the display device, or predetermining that the position of the display region is a random position on the display device each time the electronic device is locked.

5. An electronic device, comprising:
   a display device;
   at least one processor; and
   a storage device storing a plurality of instructions, which when executed by the processor, causes the at least one processor to:
   preset a plurality of icons, and designate an unlocking icon in the plurality of icons, wherein the unlocking icon comprises a group of icons in the plurality of icons and the group of icons have an unlocking sequence;
   display and move the plurality of icons on the display device when the electronic device is locked and activated, and highlight the plurality of icons one by one according to a moving direction and a time interval;
   in response to detecting a touch signal on a highlighted icon, determine whether the highlighted icon is the unlocking icon; and
   unlock the electronic device when the highlighted icon is the unlocking icon and the group of icons of the unlocking icon have been touched one by one according to the unlocking sequence.

6. The electronic device according to claim 5, wherein the at least one processor further outputs a failure prompt when a touch icon is not the highlighted icon or when the highlighted icon is not the unlocking icon.

7. The electronic device according to claim 5, wherein the plurality of icons are a plurality of color blocks having different colors, and the plurality of color blocks are arranged to be a color ribbon.

8. The electronic device according to claim 5, wherein the at least one processor further:
   presets a display region on the display device to comprise the plurality of icons; and
   predetermines a position of the display region on the display device, or predetermines that the position of the display region is a random position on the display device each time the electronic device is locked.

9. A non-transitory storage medium having stored thereon instructions that, when executed by a processor of an electronic device, causes the electronic device to perform a method for unlock the electronic device, the electronic device comprising a display device, the method comprising:
   presetting a plurality of icons, and designating an unlocking icon in the plurality of icons, wherein the unlocking icon comprises a group of icons in the plurality of icons and the group of icons have an unlocking sequence;
   displaying and moving the plurality of icons on the display device when the electronic device is locked and activated, and highlighting the plurality of icons one by one according to a moving direction and a time interval;
   in response to detecting a touch signal on a highlighted icon, determining whether the highlighted icon is the unlocking icon;

unlocking the electronic device when the highlighted icon is the unlocking icon and the group of icons of the unlocking icon have been touched one by one according to the unlocking sequence.

10. The non-transitory storage medium according to claim 9, wherein the method further comprises:
   outputting a failure prompt when a touch icon is not the highlighted icon or when the highlighted icon is not the unlocking icon.

11. The non-transitory storage medium according to claim 9, wherein the plurality of icons are a plurality of color blocks having different colors, and the plurality of color blocks are arranged to be a color ribbon.

12. The non-transitory storage medium according to claim 9, wherein the method further comprises:
   presetting a display region on the display device to comprise the plurality of icons; and
   predetermining a position of the display region on the display device, or predetermining that the position of the display region is a random position on the display device each time the electronic device is locked.

13. A computer-implemented method for executing a preset function of an electronic device, the electronic device comprising a display device, the method comprising:
   presetting a plurality of icons, and designating a preset icon in the plurality of icons, wherein the preset icon comprises a group of icons in the plurality of icons and the group of icons have a preset sequence;
   displaying and moving the plurality of icons on the display device, and highlighting the plurality of icons one by one according to a moving direction and a time interval;
   in response to detecting a touch signal on a highlighted icon, determining whether the highlighted icon is the preset icon; and executing the preset function of the electronic device when the highlighted icon is the preset icon and the group of icons of the preset icons have been touched one by one according to the preset sequence.

* * * * *